United States Patent
Lee et al.

(10) Patent No.: US 11,093,756 B1
(45) Date of Patent: Aug. 17, 2021

(54) MULTI-QUERY OBJECT MATCHING BASED ON INVERSE MODEL FREQUENCY

(71) Applicant: ObjectVideo Labs, LLC, Tysons, VA (US)

(72) Inventors: Jangwon Lee, Tysons, VA (US); Gang Qian, McLean, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 0 days.

(21) Appl. No.: 16/858,979

(22) Filed: Apr. 27, 2020

Related U.S. Application Data

(60) Provisional application No. 62/839,031, filed on Apr. 26, 2019.

(51) Int. Cl.
| | | |
|---|---|---|
| *G06K 9/00* | (2006.01) | |
| *G06K 9/46* | (2006.01) | |
| *G06F 16/583* | (2019.01) | |
| *G08B 13/196* | (2006.01) | |
| *G06F 16/532* | (2019.01) | |
| *G06K 9/62* | (2006.01) | |

(52) U.S. Cl.
CPC ....... *G06K 9/00771* (2013.01); *G06F 16/532* (2019.01); *G06F 16/5854* (2019.01); *G06K 9/46* (2013.01); *G06K 9/6215* (2013.01); *G08B 13/196* (2013.01)

(58) Field of Classification Search
CPC ...... G06K 9/3208; G06K 9/52; G06K 9/6256; G06K 9/626; G06K 9/6267; G06N 20/00; G06N 20/20
See application file for complete search history.

(56) References Cited

U.S. PATENT DOCUMENTS

| | | | |
|---|---|---|---|
| 2012/0314078 A1* | 12/2012 | Li | G06T 7/35 348/159 |
| 2019/0130216 A1* | 5/2019 | Tomioka | G06K 9/6267 |

OTHER PUBLICATIONS

Arandjelovic et al., "Multiple queries for large scale specific object retrieval," BMVC, 2012, 11 pages.
Fernando et al., "Mining multiple queries for image retrieval: On-the-fly learning of an object-specific mid-level representation," ICCV, 2013, pp. 2544-2551.
Mohedano et al., "Bags of local convolutional features for scalable instance search," Proceedings of the 2016 ACM on International Conference on Multimedia Retrieval (ICMR), ACM, 2016, 5 pages.
Tolias et al., "Particular Object Retrieval With Integral Max-Pooling of CNN Activations," ICLR, 2016, 12 pages.

* cited by examiner

*Primary Examiner* — Manuchehr Rahmjoo
(74) *Attorney, Agent, or Firm* — Fish & Richardson P.C.

(57) ABSTRACT

Methods, systems, and apparatus, including computer programs encoded on a computer storage medium, for multi-query object matching based on inverse model frequency. The methods, systems, and apparatus include actions of obtaining images of a sample object, obtaining models of known objects, determining an image score for each pair of the images and the models, determining an inverse model frequency for each image based on the image scores, determining a model score for each model based on the inverse model frequencies and the image scores, and selecting a particular known object of the known objects as the sample object based on the model scores.

17 Claims, 2 Drawing Sheets

MULTI-QUERY OBJECT MATCHING BASED ON INVERSE MODEL FREQUENCY

CROSS-REFERENCE TO RELATED APPLICATIONS

This application claims the benefit of U.S. Provisional Application No. 62/839,031, filed Apr. 26, 2019, which is incorporated by reference in its entirety.

STATEMENT REGARDING FEDERALLY SPONSORED RESEARCH OR DEVELOPMENT

This invention was made with government support under Contract N00014-17-C-2007 awarded by Office of Naval Research. The government has certain rights in the invention.

TECHNICAL FIELD

This disclosure application relates generally to monitoring systems, and more particularly, to video surveillance.

SUMMARY

Techniques are described for multi-query object matching based on inverse model frequency. Object matching from residential home security data (images, videos, audios, etc.) provides valuable information to homeowners regarding activities and events happening in the property premises (e.g., John's car just pulled into the driveway). In the home security scenarios, multiple observations of an object are available for model building and query. Approaches based on Convolutional Neural Network (CNN) may be used to extract features for object matching from single images. Accordingly, a system may extend object matching to match multiple query samples with an object.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

Like reference numbers and designations in the various drawings indicate like elements

DETAILED DESCRIPTION

Figure 1:
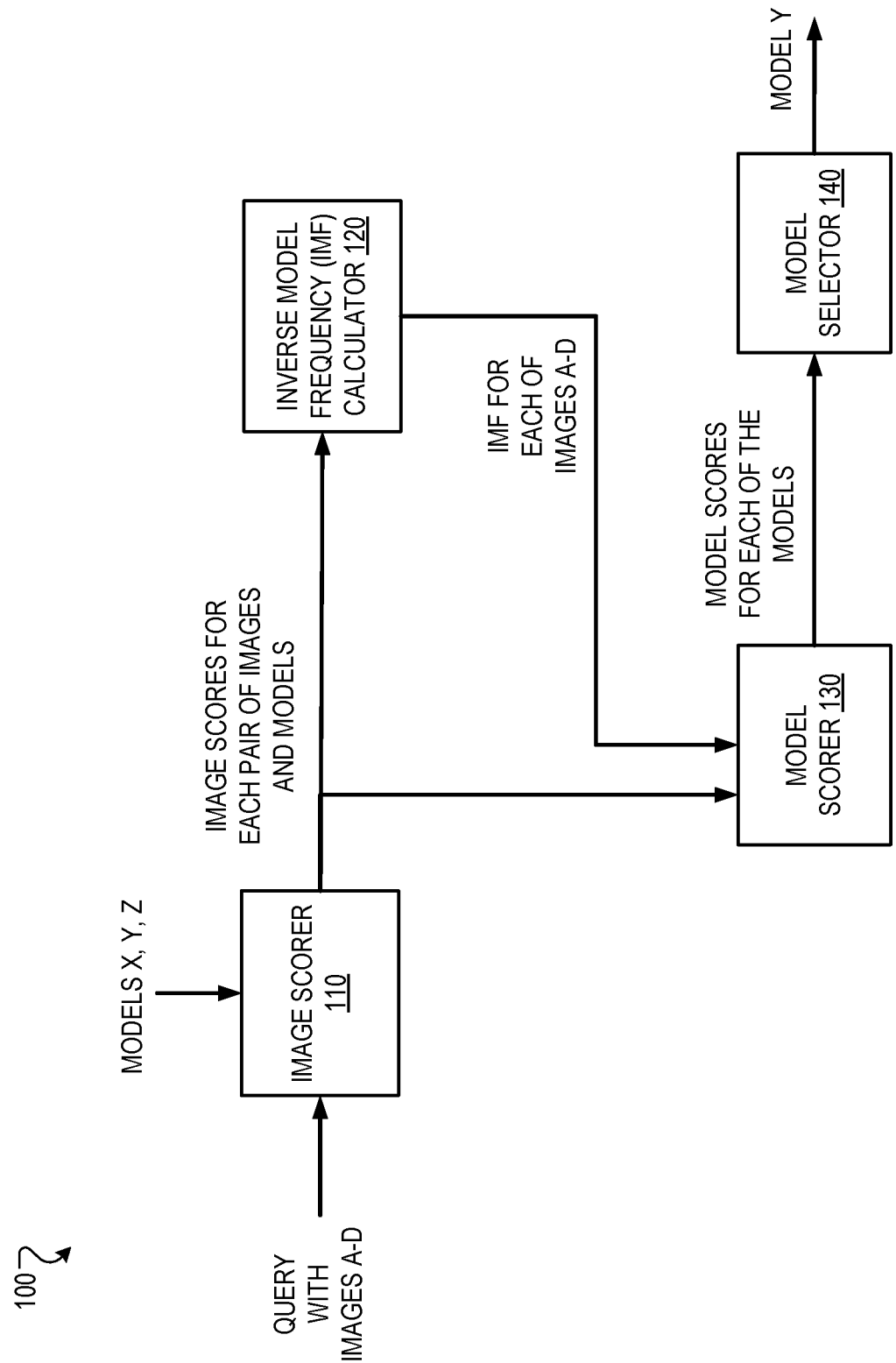
FIG. 1 illustrates a block diagram of an example system for multi-query object matching based on inverse model frequency.

FIG. 1 illustrates an example block diagram of a system 100 for multi-query object matching based on inverse model frequency. The system 100 includes an image scorer 110, an inverse model frequency (IMF) calculator 120, a model scorer 130, and a model selector 140.

The image scorer 110 may obtain a query that includes multiple images of an object to be classified and models that describe objects that are known to the system 100. For example, the system 100 may attempt to classify a vehicle shown in a video from a camera as one of vehicles X-Z known to the system 100 or as an unknown car, and the image scorer 110 may obtain a query that includes images A-D of a vehicle and three respective models for vehicles X-Z.

The image scorer 110 may determine an image score for each pair of images and models that represents a confidence that each of the images in the query matches each of the models. For example, the image scorer 110 may determine an image score of 3% for image A and vehicle X, 77% for image A and vehicle Y, 14% for image A and vehicle Z, 56% for image B and vehicle X, 86% for image B and vehicle Y, 18% for image B and vehicle Z, 60% for image C and vehicle X, 63% for image C and vehicle Y, 60% for image C and vehicle Z, 15% for image D and vehicle X, 19% for image D and vehicle Y, and 13% for image D and vehicle Z.

The image scorer 110 may determine the image scores based on a classifier that is trained to indicate a confidence that a single image belongs to a number of known objects. For example, the classifier may be trained with labeled training data that indicates features extracted from images and labels that indicate whether the features are from an image of a particular object.

The IMF calculator 120 may obtain the image scores for each of the pair of images and models and calculate an IMF for each of the images based on the image scores. For example, the IMF calculator 120 may calculate an IMF of 48% for image A, an IMF of 18% for image B, an IMF of 0% for image C, and an IMF of 0% for image D.

The IMF calculator 120 may calculate an IMF for an image based on how many image scores for that image and models satisfy a criteria. For example, the IMF calculator 120 may determine that image A has one image score for the models that is more than 50%, and determine an IMF of 48% based on taking a log of the number of models divided by one. In another example, the IMF calculator 120 may determine that image B has two image scores for the models that is more than 50%, and determine an IMF of 18% based on taking a log of the number of models divided by two.

In another example, the IMF calculator 120 may determine that image C has three image scores for the models that is more than 50%, and determine an IMF of 0% based on taking a log of the number of models divided by three. In yet another example, the IMF calculator 120 may determine that image D has zero image scores for the models that is more than 50%, and determine an IMF of 0% based on determining that none of the image scores is more than 50%.

As described in the above example, the IMF calculator 120 may use the criteria that an image score is more than 50%. However, the IMF calculator 120 may use other criteria. For example, the criteria may be that an image scores is greater than or equal to 40% or greater than 60%.

The model scorer 130 obtain the image scores for each pair of images and models and the IMF calculated for each of the images and determine a model score for each of the models. For example, the model scorer 130 may receive the image scores from the image scorer 110 and the IMFs from the IMF calculator 120. The model scorer 130 may determine the model score for each of the models based on an aggregation of the image scores modified by the IMF for the images. For example, the model scorer 130 may determine a model score of 4% for vehicle X based on by taking the sum of the product of 3% image score for image A and vehicle X by IMF of 48% for image A and the product of 56% image score for image B and vehicle Y by IMF of 18% for image B.

The model selector 140 may receive the model scores for each of the models and select a model based on the model scores. For example, the model selector 140 may receive model scores of 4% for vehicle X, 6% for vehicle Y, and 2% for vehicle Z and, in response, select vehicle Y. The model selected may correspond to the known object that the object is classified as. For example, by selecting the model for vehicle Y, the model selector 140 may indicate that the object shown in multiple images captured by a camera at a home is vehicle Y.

The model selector 140 may select the model based on determining the model score with the highest value and selecting the model corresponding to that model score. For example, the model selector 140 may determine that the model score of 6% for vehicle Y is higher than the model scores of 4% for vehicle X and 2% for vehicle Z and, in response, select vehicle Y. In some implementations, the model selector 140 may only select a model if criteria is satisfied. For example, the model selector 140 may only select a model if the high model score is greater than a prechosen threshold, e.g., 3%, 5%, 10% or some other amount. Otherwise, the object may be declared a new object and a new model may be generated for the object from the images of the object in the query.

In a particular example, given multiple query samples, $Q=\{q_1,q_2, q_3, \ldots, q_K\}$ of a query object, the system 100 feeds query samples, one at a time, to all the object model classifiers of the same object class (e.g. cars) $O=\{o_1,o_2, o_3, \ldots, o_N\}$ to obtain the sample-model confidence scores $c(q_i,o_1)$ for all the query samples against all the relevant object models. Referring to above, the images in the query may correspond to the multiple query samples, the image scorer 110 may include the object model classifiers, and the image scores may correspond to the sample-model confidence scores.

Using these sample-model confidence scores, the system 100 may formulate a sample-model confidence matrix C to facilitate the computation of the IMF of the query samples. The row of matrix C may correspond to the query sample index and column to the object model index, i.e., $C_{i,j}=c(q_i,o_j)$. To compute the IMF of a query sample, the system 100 first computes its model frequency $f_q$ using the sample-model confidence matrix C. Given sample $q_i$, the corresponding model frequency $f_{q_i}$ is the number of object models that produced corresponding sample-model confidence scores higher than a prechosen threshold σ, mathematically using the notion of set cardinality, $f_{q_i}=|\{C_{i,j}:C_{i,j}>\sigma, 1\leq j\leq N\}|$, where N is the total number of relevant object models.

Once $f_{q_i}$ is computed, the IMF for sample $q_i$ is given by $$imf_{q_i} = \log\frac{N}{f_{q_i}}.$$

In cases when $f_{q_i}=0$, the corresponding IMF $imf_{q_i}$ is set to 0. For example, referring to above, the IMF may be calculated by the IMF calculator 120 using the equation. The IMF of a query sample may naturally give more discriminative query sample higher weights, while giving lower weights to non-discriminative query samples. Finally, the system 100 computes the query-model confidence scores $S(Q,o_j)=\Sigma_{q_i\in Q}c(q_i,o_j)\cdot imf_{q_i}/k$ for each object model $o_j$. Referring to above, the model scores may correspond to the query-model confidence scores. Using these query-model confidence scores, the known object instance/model that returns the highest query-model confidence score is then selected by the system 100 as the matching object to the query object if the resulting query-model confidence score is higher than a threshold, otherwise, the query object is declared as a new object instance.

The operations performed by the system 100 to select a model may be represented by the below question $$\hat{o} = \underset{o_j \in O}{\operatorname{argmax}} S(Q, o_j) = \underset{o_j \in O}{\operatorname{argmax}} \sum_{q_i \in Q} C(q_i, o_j) \cdot imf_{q_i} = \underset{o_j \in O}{\operatorname{argmax}} \sum_{q_i \in Q} C_{i,j} \cdot \log\frac{N}{f_{q_i}}$$

Figure 2:
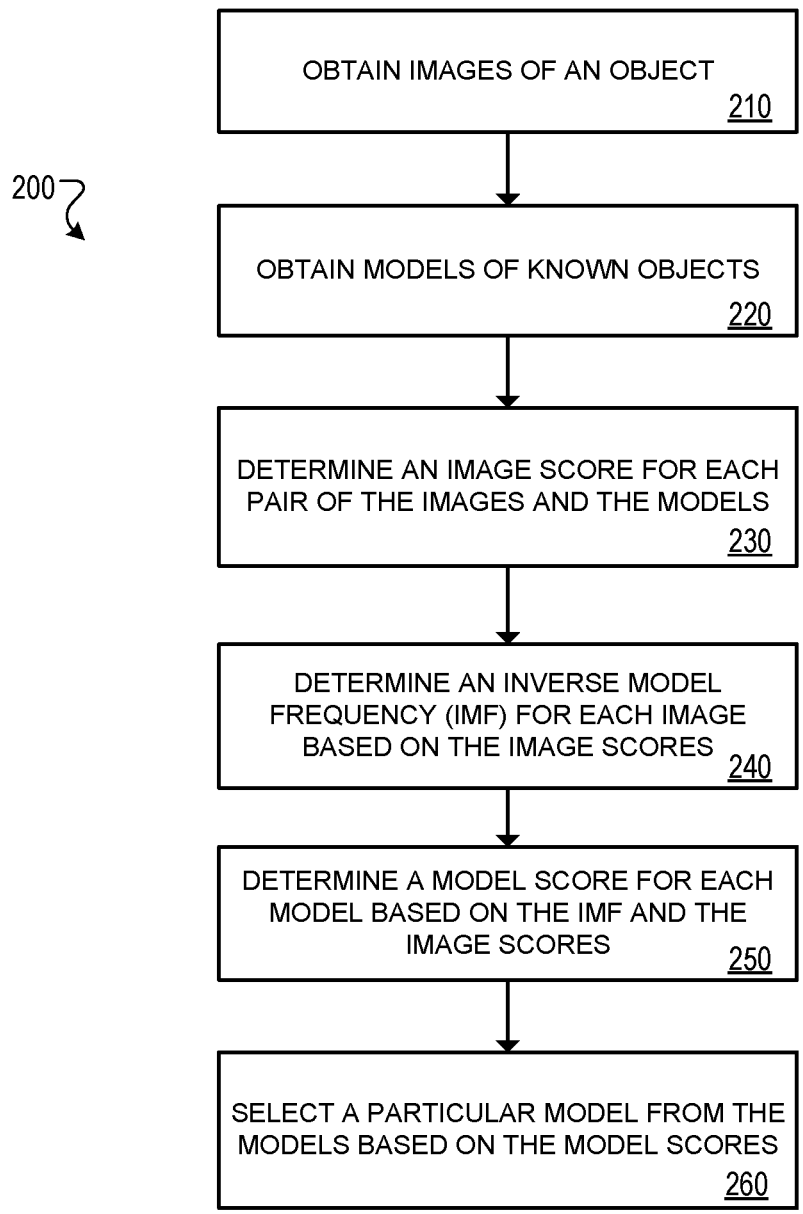
FIG. 2 is a flow diagram of an example process for multi-query object matching based on inverse model frequency.

FIG. 2 is a flow diagram of an example process 200 for multi-query object matching based on inverse model frequency. The process 200 can be implemented using system 100 described above or some other system. Thus, descriptions of process 200 may reference one or more of the above-mentioned components, modules, or computational devices of system 100. In some implementations, described actions of process 200 are enabled by computing logic or software instructions executable by a processor and memory of an example electronic device.

The process 200 includes obtaining images of an object (210). For example, the image scorer 110 may obtain multiple images of an object from a camera at a property that uploaded the multiple images in response to detecting a moving vehicle.

The process 200 includes obtaining models of known objects (220). For example, before the process 200 begins, three classifiers may be trained to classify whether a vehicle matches a different respective model for a particular vehicle and the models may then be stored in storage, and later during the process 200 the image scorer 110 may retrieve the three classifiers from the storage.

The process 200 includes determining an image score for each pair of the images and the models (230). For example, the image scorer 110 may provide each of the images in parallel to the three classifiers and obtain image scores from each of the classifiers for each of the images.

The process 200 includes determining an IMF for each image based on the image scores (240). For example, the IMF calculator 120 may determine, for each of the images, how many image scores satisfy a criteria, and then determine an IMF for that image based on the number of image scores for that image that satisfy the criteria.

In some implementations, determining an inverse model frequency for each image based on the image scores includes for a particular image of the images of the sample object, determining a number of image scores for the pairs of the particular image and the models that satisfy a criteria and determining the inverse model frequency for the particular image based on the number of image scores that satisfy the criteria. For example, the IMF calculator 120 may determine that image A has one image score for the models that is more than 50%, and determine an IMF of 48% based on taking a log of the number of models, i.e., three, divided by one. In another example, the IMF calculator 120 may determine that image B has two image scores for the models that is more than 50%, and determine an IMF of 18% based on taking a log of the number of models divided by two.

In some implementations, the inverse model frequencies for a first image with more image scores for the pairs of the first image and the models satisfying the criteria are lower than the inverse model frequencies for a second image with fewer image scores for the pairs of the second image and the models satisfying the criteria. For example, image A that only has one model with a score greater than 50% may have an IMF of 48% which is greater than an IMF of 18% of image B which has two models with a score greater than 50%.

In a particular example, the IMF calculator 120 may calculate the IMF for a particular image based on the equation:

$$imf_{q_i} = \begin{cases} \log \frac{N}{f_{q_i}}, & f_{q_i} > 0 \\ 0, & f_{q_i} = 0 \end{cases}$$

The process 200 includes determining a model score for each model based on the IMFs and the image scores (250). For example, the model scorer 130, for each model, may sum the product of the image scores for the model by the corresponding IMF for the image.

In some implementations, determining a model score for each model based on the inverse model frequency and the image scores includes determining the model score for a particular model of known objects based on a combination of the inverse model frequencies for the images and the image scores for pairs of the particular model of known objects and the images. For example, the model scorer 130 may determine a model score of 4% for vehicle X based on by taking the sum of the product of 3% image score for image A and vehicle X by IMF of 48% for image A and the product of 56% image score for image B and vehicle Y by IMF of 18% for image B.

The process 200 includes selecting a particular model from the models based on the model scores (260). For example, the model selector 140 may select the model with the highest model score if the highest model score satisfies a criteria. In some implementations, selecting a particular known object of the known objects as the sample object based on the model scores includes determining that the model score for the model of the particular known object satisfies a criteria. For example, the model selector 140 may determine that the model score of 6% for vehicle Y is higher than the model scores of 4% for vehicle X and 2% for vehicle Z and, in response, select vehicle Y.

In some implementations, selecting a particular known object of the known objects as the sample object based on the model scores includes determining that the model score for the model of the particular known object is higher than a threshold. For example, the model selector 140 may only select a model if the high model score is greater than a prechosen threshold, e.g., 3%, 5%, 10% or some other amount. Otherwise, the object may be declared a new object and a new model may be generated for the object from the images of the object in the query.

In some implementations, the process 200 includes in response to selecting the particular known object of the known objects as the sample object based on the model scores, providing an indication that the particular known object was detected. For example, the model selector 140 may transmit an alert to a device of a user that indicates that vehicle Y was detected. In another example, the model selector 140 may provide an indication to a monitoring server that vehicle Y was detected at a property and, in response, the monitoring server may send a text message of "Vehicle Y detected" to a phone number associated with the property.

In some implementations, the process 200 includes in response to selecting the particular known object of the known objects as the sample object based on the model scores, triggering a property monitoring system to perform an action. For example, the model selector 140 may provide instruct a garage door to open. In another example, the model selector 140 may provide an indication to a monitoring server that vehicle Y was detected at a property and, in response, the monitoring server may transmit an instruction of opening a garage door to a control panel at the property.

While the examples above describe image scores, model scores, and inverse model frequency in the form of a percentage, these may also be in forms other than percentages. For example, the image scores may be a value between a range of zero to one hundred with one hundred indicating highest likelihood of a match, zero to one thousand with zero indicating a highest likelihood of a match, or some other scale.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed Application-Specific Integrated Circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising: obtaining images of a sample object; obtaining models of known objects:
determining an image score for each pair of the images and the models; determining an inverse model frequency for each image based on the image scores including:
for a particular image of the images of the sample object determining a number of image scores for the pairs of the particular image and the models that satisfy a criteria: and
determining the inverse model frequency for the particular image based on the number of image scores that satisfy the criteria:
determining a model score for each model based on the inverse model frequencies and the image scores; and
selecting a particular known object of the known objects as the sample object based on the model scores.

2. The method of claim 1, wherein the inverse model frequencies for a first image with more image scores for the pairs of the first image and the models satisfying the criteria are lower than the inverse model frequencies for a second image with fewer image scores for the pairs of the second image and the models satisfying the criteria.

3. The method of claim 1, wherein determining a model score for each model based on the inverse model frequency and the image scores comprise:
determining the model score for a particular model of known objects based on a combination of the inverse model frequencies for the images and the image scores for pairs of the particular model of known objects and the images.

4. The method of claim 1, wherein selecting a particular known object of the known objects as the sample object based on the model scores comprises:
determining that the model score for the model of the particular known object satisfies a criteria.

5. The method of claim 1, wherein selecting a particular known object of the known objects as the sample object based on the model scores comprises:
determining that the model score for the model of the particular known object is higher than a threshold.

6. The method of claim 1, comprising:
in response to selecting the particular known object of the known objects as the sample object based on the model scores, providing an indication that the particular known object was detected.

7. The method of claim 1, comprising:
in response to selecting the particular known object of the known objects as the sample object based on the model scores, triggering a property monitoring system to perform an action.

8. A system comprising:
one or more computers and one or more storage devices storing instructions that are operable, when executed by the one or more computers, to cause the one or more computers to perform operations comprising:
obtaining images of a sample object; obtaining models of known objects;
determining an image score for each pair of the images and the models; determining an inverse model frequency for each image based on the image scores, including:
for a particular image of the images of the sample object, determining a number of image scores for the pairs of the particular image and the models that satisfy a criteria: and
determining the inverse model frequency for the particular image based on the number of image scores that satisfy the criteria:
determining a model score for each model based on the inverse model frequencies and the image scores; and
selecting a particular known object of the known objects as the sample object based on the model scores.

9. The system of claim 8, wherein the inverse model frequencies for a first image with more image scores for the pairs of the first image and the models satisfying the criteria are lower than the inverse model frequencies for a second image with fewer image scores for the pairs of the second image and the models satisfying the criteria.

10. The system of claim 8, wherein determining a model score for each model based on the inverse model frequency and the image scores comprises:
determining the model score for a particular model of known objects based on a combination of the inverse model frequencies for the images and the image scores for pairs of the particular model of known objects and the images.

11. The system of claim 8, wherein selecting a particular known object of the known objects as the sample object based on the model scores comprises:
determining that, the model score for the model of the particular known object satisfies a criteria.

12. The system of claim 8, wherein selecting a particular known object of the known objects as the sample object based on the model scores comprises:
determining that the model score for the model of the particular known object is higher than a threshold.

13. The system of claim 8, the operations comprising:
in response to selecting the particular known object of the known objects as the sample object based on the model scores, providing an indication that the particular known object was detected.

14. The system of claim 8, the operations comprising:
in response to selecting the particular known object of the known objects as the sample object based on the model scores, triggering a property monitoring system to perform an action.

15. A non-transitory computer-readable medium storing software comprising instructions executable by one or more computers which, upon such execution, cause the one or more computers to perform operations comprising:
obtaining images of a sample object;
obtaining models of known objects; determining an image score for each pair of the images and the models; determining an inverse model frequency for each image based on the image scores, including
for a particular image of the images of the sample object, determining a number of image scores for the pairs of the particular image and the models that satisfy a criteria: and
determining the inverse model frequency for the particular image based on the number of image scores that satisfy the criteria:
determining a model sore for each model based on the inverse model frequencies and the image scores; and
selecting a particular known object of the known objects as the sample object based on the model scores.

16. The medium of claim 15, wherein the inverse model frequencies for a first image with more image scores for the pairs of the first image and the models satisfying the criteria are lower than the inverse model frequencies for a second image with fewer image scores for the pairs of the second image and the models satisfying the criteria.

17. The medium of claim 15, wherein determining a model score for each model based on the inverse model frequency and the image scores comprises:
  determining the model score for a particular model of known objects based on a combination of the inverse model frequencies for the images and the image scores for pairs of the particular model of known objects and the images.

* * * * *

UNITED STATES PATENT AND TRADEMARK OFFICE
CERTIFICATE OF CORRECTION

PATENT NO. : 11,093,756 B1  
APPLICATION NO. : 16/858979  
DATED : August 17, 2021  
INVENTOR(S) : Jangwon Lee, Gang Qian and Allison Beach Page 1 of 1

It is certified that error appears in the above-identified patent and that said Letters Patent is hereby corrected as shown below:

In the Claims

In Claim 1, Column 7, Line 4, delete "objects:" and insert -- objects; --, therefor.

In Claim 1, Column 7, Line 9, delete "object" and insert -- object, --, therefor.

In Claim 3, Column 7, Line 29, delete "comprise:" and insert -- comprises: --, therefor.

In Claim 11, Column 8, Line 30, delete "that," and insert -- that --, therefor.

In Claim 15, Column 8, Line 56, delete "including" and insert -- including: --, therefor.

In Claim 15, Column 8, Line 64, delete "sore" and insert -- score --, therefor.

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*